United States Patent

[11] 3,623,446

| [72] | Inventor | William J. Shimanckas<br>Waukegan, Ill. |
| --- | --- | --- |
| [21] | Appl. No. | 825,834 |
| [22] | Filed | May 19, 1969 |
| [45] | Patented | Nov. 30, 1971 |
| [73] | Assignee | Outboard Marine Corporation<br>Waukegan, Ill. |

[54] SWIVEL BRACKET LOCK NO BACK STEERING
5 Claims, 5 Drawing Figs.

[52] U.S. Cl...................................................... 115/18,
114/172
[51] Int. Cl........................................................ B63h 21/26
[50] Field of Search.............................................. 115/18;
74/531, 527; 188/82.84

[56] References Cited
UNITED STATES PATENTS

| 403,562 | 5/1889 | Stickney.................. | 74/531 |
| --- | --- | --- | --- |
| 2,700,358 | 1/1955 | Johnson.................... | 115/18 |
| 2,855,800 | 10/1958 | Curtin...................... | 74/531 |

*Primary Examiner*—Andrew H. Farrell
*Attorneys*—Robert E. Clemency, John W. Michael, Gerrit D. Foster, Bayard H. Michael, Paul R. Puerner, Joseph A. Gemignani, Andrew O. Riteris, Spencer B. Michael and Robert K. Gerling ABSTRACT: Disclosed herein is an outboard motor steering mechanism including a locking lever fixedly secured to a marine propulsion unit mounted for pivotal-steering movement on a swivel bracket, a pair of rollers biased to positively restrain movement of the locking lever with respect to the swivel bracket and a steering arm pivotally connected to the propulsion unit and having a first set of adjustable members to release one or the other of the rollers and a second set of adjustable members to engage the locking lever after releasing one or the other of the rollers.

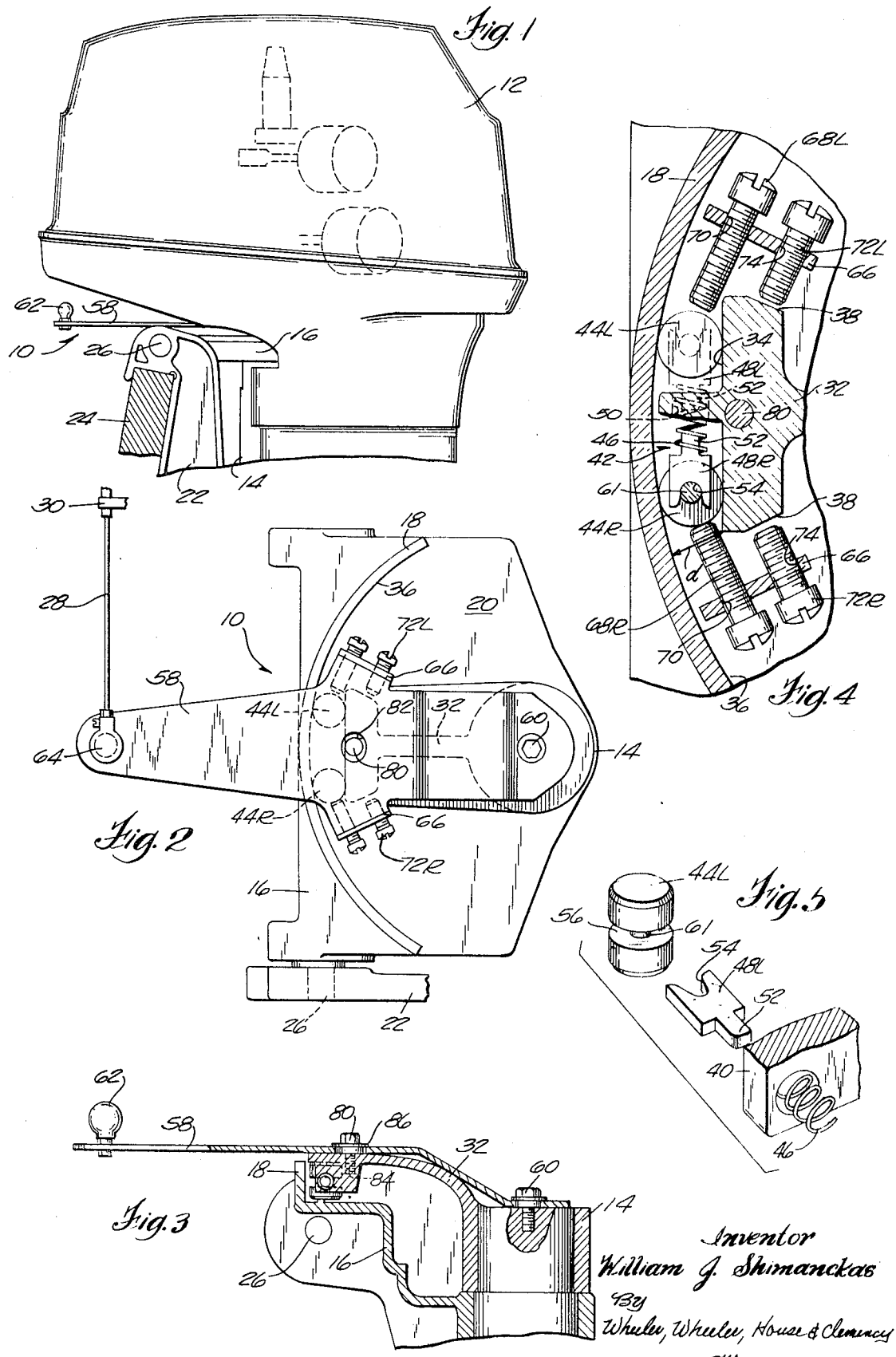

SWIVEL BRACKET LOCK NO BACK STEERING

BACKGROUND OF THE INVENTION

Outboard motors or stern drive units of the type contemplated herein include a marine propulsion unit supported by a kingpin for pivotal steering movement on a swivel bracket supported on the transom of a boat by stern or clamp brackets. Steering movements are generally imparted to the propulsion unit through a push-pull cable or Bowden wire connected to a steering control actuator located at a remote point in the boat. These propulsion units are subject to steering movements or backlash from forces originating in the propulsion unit. Various mechanisms have been devised to restrain such steering movements such as shown and described in U.S. Pat No. 3,310,021 and in patent applications Ser. No. 639,813, filed May 19, 1967, now abandoned.

SUMMARY OF THE INVENTION

The steering mechanism of this invention releasably restrains the steering movements of a marine propulsion unit from forces originating in the propulsion unit by providing a positive restraint to such movements. More particularly, the invention provides a steering mechanism including a lever fixedly secured to a propulsion unit, means on the lever and on a swivel bracket for releasably restraining movement of the lever with respect to the swivel bracket, and a steering arm adapted to be responsive to operator actuation and connected for movement relative to the lever and including first means engageable with the restraining means for releasing restraint against movement of the lever with respect to the swivel bracket in response to initial steering arm movement and second means engageable with the lever for pivoting the lever and the connected propulsion unit relative to the swivel bracket in response to continued steering arm movement.

In one particular embodiment, restraint to marine propulsion steering movement originating in the propulsion unit is provided by placing a pair of rollers in a position to become wedged between the end of a locking lever connected to the propulsion unit and a circular flange provided on the swivel bracket. The rollers are biased to the wedged position between the locking lever and swivel bracket to assure a positive restraint to steering movements originating in the propulsion unit. The rollers are released by a steering arm pivotally connected to the propulsion unit when steering movements are imparted to the steering arm from an actuator located at a remote point in the boat. The steering arm is provided with a lost motion connection to the locking lever to allow for the release of the rollers prior to imparting steering movement to the propulsion unit. This steering mechanism is compact and can be mounted directly on the swivel bracket providing a self-contained unit for the propulsion unit. This location for the steering mechanism also allows the propulsion unit to be freely tilted vertically for repair or to clear objects in the water.

Other objects and advantages of the present invention will become apparent from the following description when read in connection with the accompanying drawings in which:

FIG. 1 is a side view in elevation of an outboard motor showing the location of the steering mechanism.

FIG. 2 is a top view of the steering mechanism.

FIG. 3 is a side view in section of the steering mechanism.

FIG. 4 is a section view of the locking assembly of this invention.

FIG. 5 is an exploded view of one of the rollers and roller supports for the locking assembly.

DESCRIPTION OF THE INVENTION

The steering mechanism 10 as seen in the drawings is used with a marine propulsion unit 12 of the type secured to a kingpin or steering bracket 14 which is mounted for vertical swinging movement on a swivel bracket 16 having on its upper surface 20 a circular flange 18. The swivel bracket 16 is connected by a horizontal tilt pin 26 for vertical swinging movement about a stern or clamp bracket 22 mounted on the transom 24 of the boat. Steering movements originating from an actuator located at a remote point in the boat are imparted to the propulsion unit 12 by means of a steering cable 28 of the push-pull or Bowden wire type connected to the transom 24 by a bracket 30. The marine propulsion unit 12 is shown as part of an outboard motor, however, it is within the contemplation of this invention to use the steering mechanism 10 with a propulsion unit for a stern drive unit.

In accordance with the invention, the steering mechanism 10 releasably locks the propulsion unit 12 to the swivel bracket 16 to prevent pivotal or steering movement of the propulsion unit 12 from steering forces originating in the propulsion unit 12. More specifically, the steering mechanism 10 includes a locking lever 32 fixedly secured to the kingpin 14 for the propulsion unit 12. The locking lever 32 extends radially from the kingpin 14 over the swivel bracket 16 and terminates in a flat planar surface or wall 34 spaced from the inner circular surface 36 of the circular flange 18. Generally, radially extending surfaces 38 are provided at each end of the wall 34 and a radially extending flange 40 having an aperture 50 is provided in the center of the wall 34.

In order to prevent movement of the locking lever 32 with respect to the swivel bracket 16, means are provided for releasably restraining movement of the locking lever 32 with respect to the flange 18 in the form of a locking assembly 42. This assembly 42 is supported by the radially extending flange 40 in the space between the wall 34 and the inside surface 36 of rollers 44R and 44L biased by means of a spring 46 outwardly to wedged positions between the wall 34 and the inner surface 36 of the flange 18 which converges toward the outer ends of the wall 34. Each roller 44R and 44L is divided by a centrally located groove 56 into upper and lower sections connected by a stem 61 and has a diameter larger than the radial distance "d" between the end of wall 34 and the inner surface 36 of the flange 18.

The rollers 44R and 44L are supported on the end wall 34 by means of the spring 46 and a pair of roller support plates 48R and 48L. As seen in FIG. 4, the spring 46 is positioned in the aperture 50 provided in flange 40. Each of the plates 48R and 48L includes at one end a tab 52 and at the other end a notch 54. The plates 48R and 48L are inserted into the grooves 56 provided in the rollers 44R and 44L until the notch 54 in each of the plates seats against the stem 61. The tabs 52 are inserted into the ends of the spring 46.

The wedging action of the rollers 44R and 44L is best described with reference to the direction of motion of the locking lever 32 in FIG. 4. Movement of the locking lever 32 clockwise will cause the trailing roller 44R to become wedged between the wall 34 and the inner surface 36 of the flange 18. Movement of the locking lever 32 counterclockwise will cause the trailing roller 44L to become wedged between the wall 34 and the inner surface 36 of the flange 18. Since the rollers 44R and 44L are biased by the spring 46 to wedged positions, little, if any, movement will occur between the locking lever 32 and the swivel bracket 16.

The propulsion unit 12 is pivoted in response to steering movements originating from the steering cable 28 by means of a steering arm 58 having one end connected by a bolt 60 to pivot about the axis of the kingpin 14. The steering arm 58 can also be pivotally connected to the propulsion unit 12 or to the locking lever 32. The other end of the steering arm 58 is connected by means of a ball connector 62 provided on the outer end of the steering arm 58 to a socket connector 64 provided on the end of the steering cable 28. The steering arm 58 includes a pair of generally upstanding flanges 66 extending generally radially from the axis of the kingpin and having two pairs of members or bolts 68 and 72 threadedly received in apertures 70 and 74, respectively, provided in the flanges 66.

The rollers 44 are released from their wedged positions between the wall 34 and the flange 18 by means of the first pair of members 68 which are aligned to intersect the axis of the rollers 44R and 44L. On movement of the steering arm 58, clockwise in Figs. 2 and 4, the member 68R will engage the trailing roller 44R pushing the roller 44R out of the path of motion of the wall 34 of the locking lever 32. On movement of the steering arm 58, counterclockwise, the member 68L will engage the roller 44L pushing the roller 44L out of the path of motion of the wall 35 of the locking lever 32.

In order to transfer the steering movement of the steering arm 58 to the locking lever 32, means engageable with the locking lever 32 are provided in the steering arm 58 for limiting the amount of relative movement between the steering arm 58 and the locking lever 32. Such means is in the form of the second pair of members 72 which are positioned to engage the radial surfaces 38 on the locking lever 32. The members 72R and 72L can be adjusted to allow for a small amount of lost motion between the movement of steering arm 58 and the locking lever 32 to allow one of the members 68R or 68L to engage and move the trailing roller 44R or 44L ahead of the locking lever 32.

Means are provided for moveably securing the steering arm 58 to the locking lever 32 to retain the rollers 44 in the space between the flange 12 and locking lever 32. Such means is in the form of a holddown bolt 80 extending through an elliptical opening 82 provided in the steering arm 58. The bolt 80 is provided with a washer 86 and is threadedly received in a threaded aperture 84 provided in the locking lever 32. The elliptical opening 82 allows for movement between the steering arm 58 and the locking lever 32.

Various of the features of the invention are set forth in the following claims.

What is claimed is:

1. An outboard motor comprising a clamp bracket, a swivel bracket connected to said clamp bracket about a horizontal axis for vertical swinging movement of said swivel bracket relative to said clamp bracket, a propulsion unit mounted for pivotal movement on said swivel bracket about an axis transverse to said horizontal axis to afford steering movement of said propulsion unit, a locking lever fixedly secured to said propulsion unit, means for restraining movement of said locking lever with respect to said swivel bracket, and a steering arm pivotally connected to one of said locking lever and said propulsion unit and including means on said steering arm engageable with said locking lever for limiting relative movement between said steering arm and said locking lever, said limiting means including a pair of members mounted on said steering arm, and means for releasing said restraining means upon movement of said steering arm relative to said locking lever.

2. An outboard motor according to claim 1 wherein said pair of members are adjustably mounted on said steering arm to provide lost motion between said steering arm and said locking lever.

3. An outboard motor according to claim 2 wherein said releasing means includes a second pair of members mounted on said steering arm.

4. A steering mechanism for a marine propulsion unit mounted for pivotal movement on a swivel bracket, said mechanism comprising a locking lever fixedly secured to said propulsion unit, means for releasably restraining movement of said locking lever with respect to the swivel bracket, and a steering arm connected for movement relative to said locking lever and including a first pair of adjustable members positioned to engage said restraining means and a second pair of adjustable members positioned to engage said locking lever.

5. A steering mechanism according to claim 4 wherein said restraining means includes a pair of rollers located for movement into a wedged position between said locking lever and the swivel bracket, thereby to prevent relative movement between said locking lever and the swivel bracket.

* * * * *